Dec. 28, 1954 G. N. FISHER 2,698,249
CHEESE PACKAGING
Filed Sept. 13, 1949 3 Sheets-Sheet 1
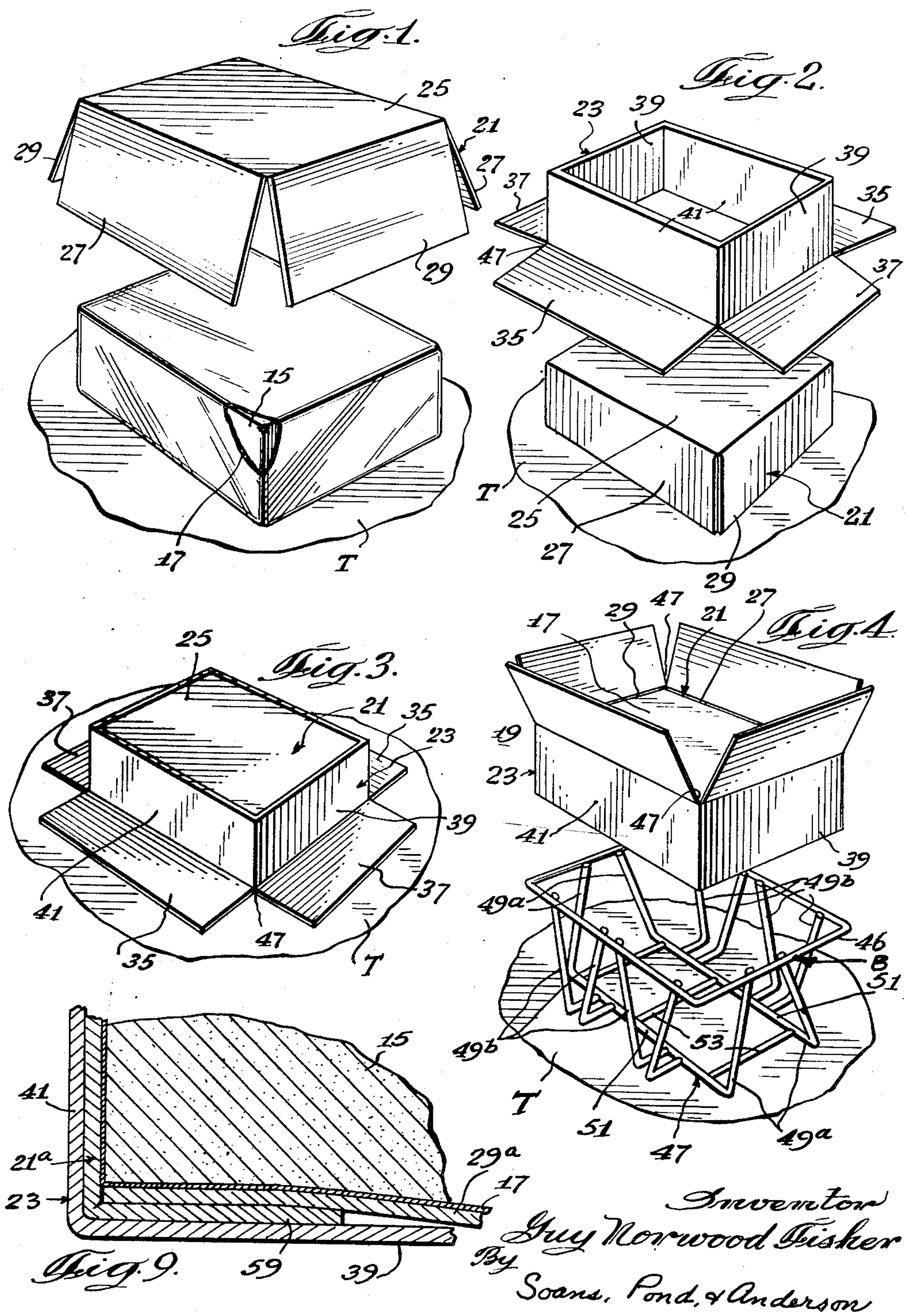
Inventor
Guy Norwood Fisher
By Soans, Pond, & Anderson
Attorneys Dec. 28, 1954 G. N. FISHER 2,698,249
CHEESE PACKAGING
Filed Sept. 13, 1949 3 Sheets-Sheet 2
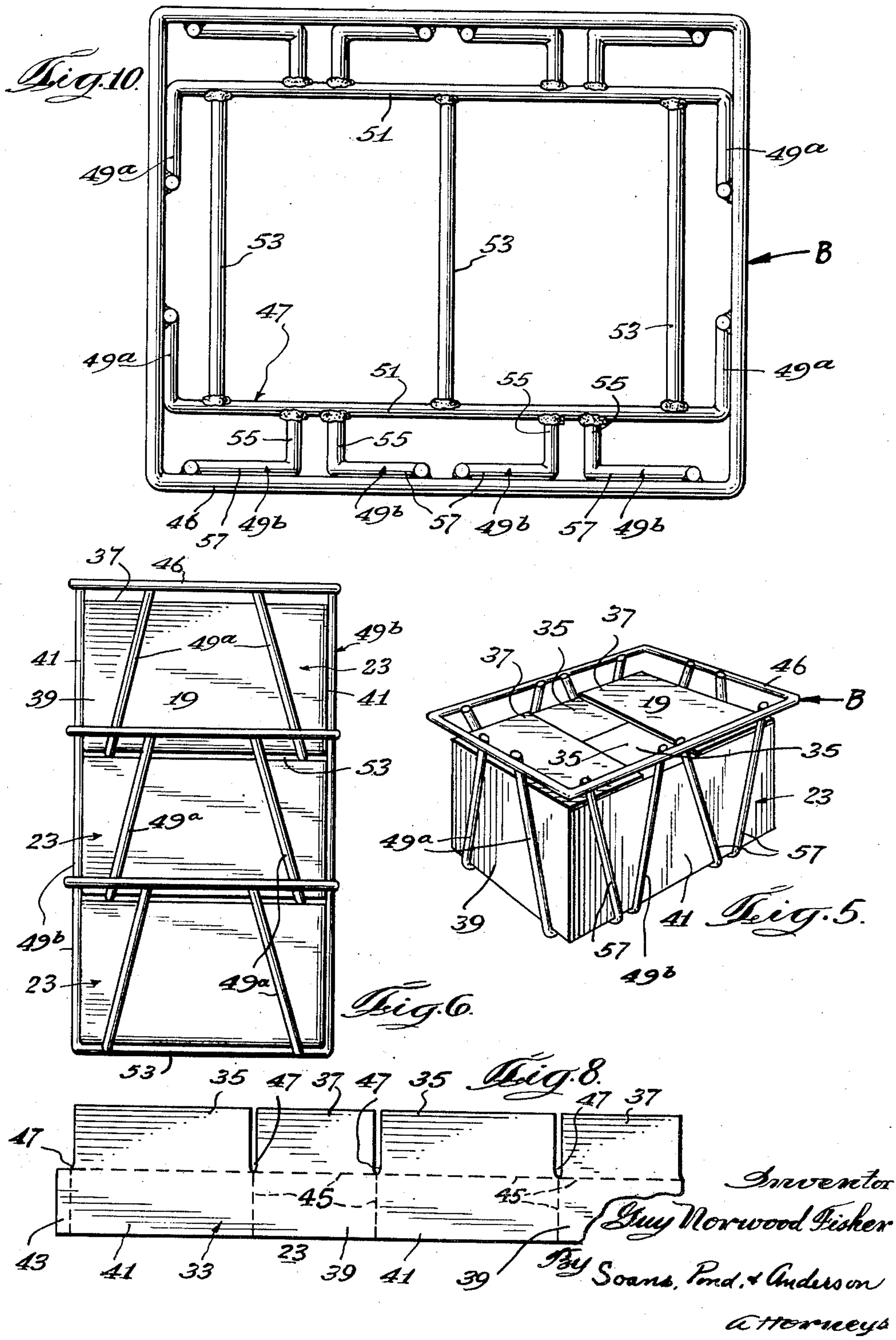
Inventor
Guy Norwood Fisher
By Soans, Pond & Anderson
Attorneys Dec. 28, 1954 G. N. FISHER 2,698,249
CHEESE PACKAGING
Filed Sept. 13, 1949 3 Sheets-Sheet 3
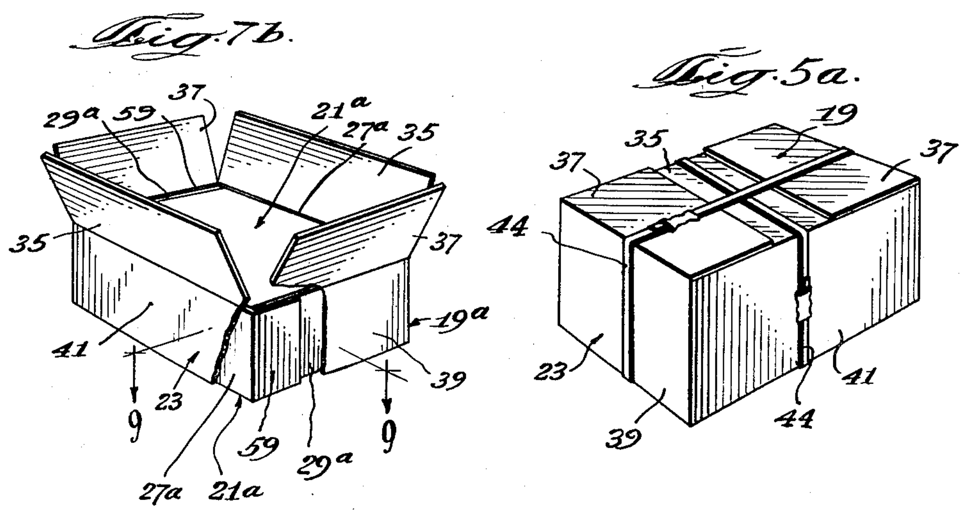
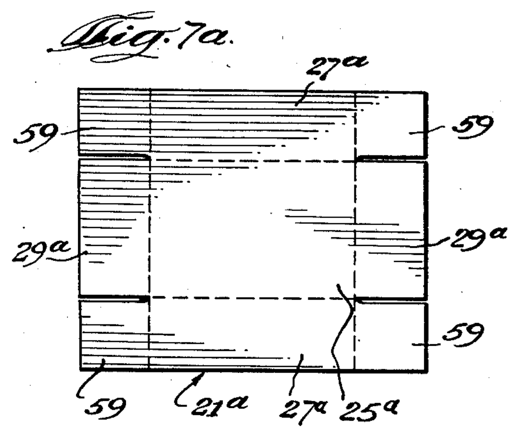
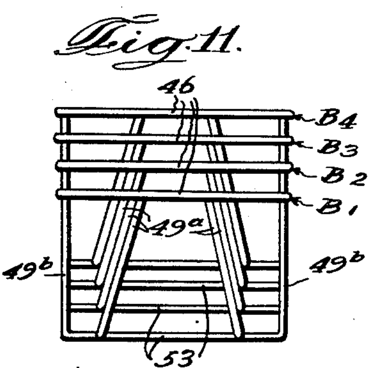
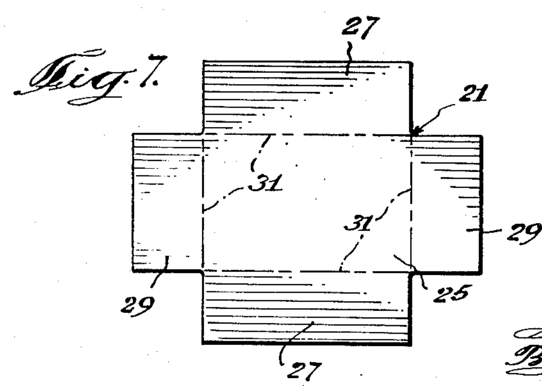
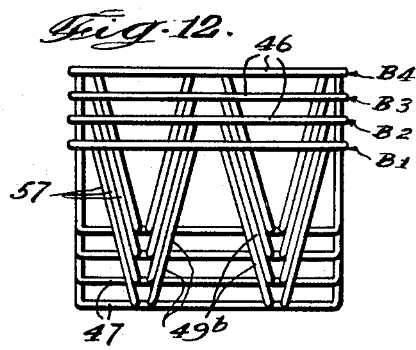
Inventor
Guy Norwood Fisher
By Soans, Pond, & Anderson
Attorneys 2,698,249
Patented Dec. 28, 1954

2,698,249

CHEESE PACKAGING

Guy Norwood Fisher, Wilmette, Ill., assignor to Kraft Foods Company, Chicago, Ill., a corporation of Delaware Application September 13, 1949, Serial No. 115,358

1 Claim. (Cl. 99—178)

The present invention relates to the packaging of cheese and more particularly, to the packaging of natural cheese during the curing period.

Under recently developed curing procedures, various natural cheeses are wrapped, prior to curing, in a thin, flexible sheet of water and moisture resistant material, as for example, a rubber hydrochloride sheet, a sheet of laminated cellophane, or the like. The wrapped, uncured or green cheese is then cured under pressure in a rigid cheese box or in an expansible mold. The curing of cheddar and like cheeses, i. e., cheese of the Colby, washed curd, or stirred curd types, in a rigid cheese box is described in Patent No. 2,424,693 which was issued to Lewis H. Jones.

While the use of the Jones method in curing cheddar cheese can produce a high quality cheese, the increased cost of the process is about equal to or may even exceed the gain which is obtained by the enhancement in grade of the finished cheese. Accordingly, the use of a pressure curing method in the cheddar process has been greatly restricted. The high cost of the pressure-curing procedure is due to several factors. First, adjustably sized molds are expensive and rigid boxes with insert liners to provide the necessary pressure are not practical in large scale operation since the height of each green cheese varies greatly as it is removed from the hoop. Further, the storage of rigid cheese boxes or the known adjustable molds requires a large amount of space. In addition, the expense of returning the molds from the processing or packing plant to the cheese factory is so great that any profit realized from the advantages of the process is consumed by the shipping and handling charges.

Another disadvantage of a pressure-curing process is that the film of flexible material is often broken as the wrapped cheese is placed in the mold or box for curing. Since the boxes or molds are opaque, it is impossible to determine whether or not the wrapper has been damaged and, as a result, much cheese becomes subject to molding due to hidden breaks in the wrapper.

Accordingly, the principal object of my invention is the provision of an adjustably sized cheese box which is inexpensive to fabricate and which requires a minimum amount of space for storage or transport. A further object of the invention is the provision of a cheese box which may be applied to a wrapped cheese without danger of tearing or otherwise damaging the wrapper. Other objects and advantages of the invention will become known by reference to the following description and the accompanying drawings of certain embodiments thereof.

In the drawings:

Figs. 1 to 5, inclusive, show successive steps in applying a cheese package employing various features of the invention, to a block of green cheese;

Fig. 5*a* illustrates one means of reinforcing a carton in accordance with the invention;

Fig. 6 is an elevational view of a plurality of wrapped and packaged cheeses which are stacked for curing;

Fig. 7 is a plan view of one element of the cheese package shown in the preceding figs.;

Fig. 7*a* is a plan view of a modified element of the type shown in Fig. 7;

Fig. 7*b* is a view similar to Figs. 5 and 5*a* showing a cheese package which includes the element shown in Fig. 7*a*;

Fig. 8 is a surface development of another of the elements of the cheese package illustrated in the preceding figs.;

Fig. 9 is a sectional view taken on line 9—9 in Fig. 7*b*;

Fig. 10 is a plan view of a basket which may be employed to protectively surround the packaged cheese during curing;

Fig. 11 is an end elevational view of a plurality of baskets which are nested for storage; and Fig. 12 is a side elevational view of the baskets illustrated in Fig. 11.

In the curing of cheddar cheese, a block of fresh, uncured, or green cheese 15 is first wrapped in a layer of moisture and water proof material 17 such as, for example, a film of rubber hydrochloride or a sheet of laminated cellophane. However, in place of sheet material, the block of green cheese 15 may be bandaged and dipped in paraffin or like coating material in the normal manner. If a sheet of rubber hydrochloride material is used, it is desirably about 0.0004 inch thick, but the film may have a thickness as great as 0.0006 inch. The sheet 17 may be wrapped around the cheese in any conventional manner or an envelope of the film may be slipped over the cheese and then folded to enclose the cheese in the manner shown in the Jones patent, No. 2,424,693.

A cheese package in accordance with the invention comprises a carton 19 (Fig. 5) of corrugated paperboard, laminated fiber-board, or the like which is moisture resistant. The board must have a relatively high bursting strength, but must still be foldable when properly scored. The carton 19 is fabricated in two sections, indicated as 21 and 23 in the drawings. One of the sections, 21, comprises the bottom and inner side members of the carton 19, and the other of the sections, 23, comprises a sleeve member which forms a sliding or telescoping connection with the side members of the section 21. The sleeve-like section 23 is provided with portions which constitute a cover for the top of the carton.

Section 21, as illustrated in Fig. 7, constitutes a flat sheet of paperboard or the like which is cut in the form of a cross. The proportions of the cross are such that a central panel 25 is provided which registers with the bottom area of the block of cheese to be packaged. The arms of the cross-like sheet provide two pairs of flaps, 27 and 29, which constitute the side and end panels, respectively, for the section 21. The flaps 27 and 29 are so proportioned that the sides and ends of the block of cheese are substantially completely enclosed (Fig. 2). The section 21 is scored in the usual manner as indicated by the dot-dash lines 31 in Fig. 7 so that the flaps or side panels 27 and 29 may be easily folded about the block of cheese.

The section 23 which comprises the sleeve-like member is also fabricated from a flat sheet of corrugated paperboard, laminated fiber-board or the like. The sheet is cut in the form of an elongated rectangular strip 33, as illustrated in Fig. 8, and is then folded into the tubular shape shown in Figs. 2 to 4, inclusive. The strip 33 is provided with a series of tabs and flaps which are proportioned to form two pairs of top flaps 35 and 37 for the carton 19 when it is assembled. In addition to the flaps 35 and 37, the strip 33 includes an unbroken area which is adapted to provide end and side panels, 39 and 41, respectively, for the finished carton. Each of the flaps 35 is proportioned so that it will enclose one-half of the top of the wrapped block of cheese 15, and each of the other pair of flaps 37 is proportioned so that it will overlie the flaps 35 to provide a lock for these flaps. A tab 43 is provided at one end of the strip 33, and this tab is adapted to be stapled or otherwise fastened to the opposite end of the strip 33 to form the sleeve-like member shown in Figs. 2 to 4, inclusive. Of course, suitable score lines 45 are provided on the strip 33 to facilitate folding and forming the sleeve member and the top flaps 35 and 37. It will also be noted from Fig. 8 that portions of the strip 33 intermediate the flaps 35 and 37 are cut away, as illustrated at 47, to provide clearance at the corners for folding the strips.

While various paperboard products may be used in fabricating the sections 21 and 23 of the carton, extensive tests have shown that it is preferable to use a laminated fiber-board having sufficient mechanical strength for supporting the cheese during the curing period and yet is sufficiently flexible to be repeatedly folded along score lines without causing fractures in the board surface.

When placing a cheese in a carton in accordance with the invention, the cheese 15 is first wrapped in the flexible film 17 as shown in Fig. 1, and is then placed upon a table or other flat surface T. Section 21 of the carton is then placed over the wrapped block of cheese so that the upper surface and the side and end surfaces of the block of cheese are covered by the panels 25, 27, and 29, respectively (Figs. 1 and 2). The sleeve-like section 23 is then placed above the block of cheese which is enclosed by the section 21 in the manner shown in Figs. 2 and 3. When placing the sleeve-like section 23 over the block, the flaps 35 and 37 are disposed on the lower side of the section 23 and are folded outwardly as shown in Fig. 2. With the flaps 35 and 37 serving as a guide, the sleeve-like section is slid over the side and end panels 27 and 29 of the section 21 into the position shown in Fig. 3. It will be noted that the section 21 protects the sides of the flexible film which covers the bottom and the sides of the cheese from any abrading action which might be caused by the movement of the section 23 over the cheese. The cheese, which is now covered on its upper surface by the single layer of material and on its side and end surfaces by a double layer of material, is inverted into the position shown in Fig. 4 and the flaps 35 and 37 are closed into the position shown in Fig. 5.

The closed cartons 19 may be stacked one upon the other to provide the pressure desired for curing the cheese. The telescoping connection between the sections 21 and 23 readily transmits the pressure of the upper blocks of cheese to the lower blocks. When curing cheeses which are in stacked relation, it is desirable to turn at least the top carton over to hold the flaps 35 and 37 in the closed position under the pressure provided by the weight of the cheese in the carton.

After the cheese has cured the required length of time, the cured cheese in the carton 19 is shipped to a processing or packing plant where the carton is removed from the cheese. The section 21 may be flattened out for return shipment, and the sleeve-like sections 23 may be collapsed by applying pressure diagonally of the section. The flattened sections are then returned to the cheese factory for re-use.

While under most storage conditions the cheese may be cured in the carton without any additional reinforcing of the carton, it is desirable, under some conditions and especially in curing rooms where it is necessary to stack a great many cheeses one upon the other, to provide means for reinforcing the side walls of the carton. It has been determined that a satisfactory reinforcing means for most conditions is provided by applying one or more narrow bands 44 of steel strapping of the type used in sealing shipping boxes around the girth of the box, as is shown in Fig. *5a*. This strapping may be tensioned and locked in position by the conventional equipment which is used for sealing boxes and the like.

Sometimes under adverse storage conditions, it is advisable to place the packaged cheese in a wire basket which is formed with vertical sides which serve to reinforce the side walls of the carton. A particularly effective basket for this purpose is illustrated in Figs. 4, 5, 10, 11, and 12. The basket, indicated generally as B, is fabricated in such a manner that a plurality of baskets, $B_1$ to $B_4$, Figs. 11 and 12, will be readily nestable and yet at the same time, the baskets will define vertically extending supporting walls for the packaged cheese.

The wire basket B includes a rectangular-shaped ring 46 at the upper edge thereof and a skeletonized, rectangular-shaped base 47 which are interconnected by vertically disposed, angularly extending members **49*a* and 49*b* at the ends and sides thereof, respectively. The skeletonized base 47 comprises a pair of longitudinally extending members 51 which are spaced apart a distance which is less than the width of the ring 46. The longitudinally extending members 51 are rigidly connected by a plurality of transversely extending members 53. The angularly extending, vertically disposed members 49*a* at the ends of the basket B may comprise extensions of the longitudinally extending members 51 which constitute a part of the skeletonized base 47 (Figs. 4, 5, and 10). As illustrated in the drawings, the longitudinally extending members 51 are continued longitudinally to a point underlying the rectangular ring 46 and are then extended upwardly as shown in Figs. 4, 5, and 10. The members 49*a* converge as they extend upwardly, and the upper end of each of the members 49*a* is welded or otherwise attached to the ring 46. It should be particularly noted that the members 49*a* define vertical supporting planes for the ends of the carton and are fastened to the inner surface of the ring 46**.

Each of the sides of the basket B are defined by four vertically disposed, angularly extending members **49*b*. Each of the bracing members 49*b* includes a horizontally disposed section 55 which is adapted to be attached to the skeletonized base and a vertically extending section which is adapted to be connected to the ring 46. As is illustrated in Figs. 5 and 12, the members 49*b* diverge as they extend upwardly, thereby providing V-shaped receptacles for receiving the angularly disposed members 49*b* of other baskets. Further, the members 49*b*** provide vertically extending side braces for the associated carton.

As shown particularly in Figs. 11 and 12, a plurality of the wire baskets $B_1$ to $B_4$ are readily nestable to form a compact unit which may be easily shipped and handled. The angularly disposed members **49*a* and 49*b*** provide means for interengaging the baskets and, as may be seen from Fig. 10, these angularly disposed members define vertically extending surfaces for reinforcing the walls of the cheese carton.

The ring 46, the skeletonized base 47, and the vertically extending side members **49*a* and 49*b*** may be fabricated from any desired material. However, particularly effective results are obtained if the various elements of the basket B are fabricated from ¼ inch diameter steel rod. After assembly, the basket B may be heavily galvanized to provide protection against corrosion.

A modified carton **19*a*** in accordance with the invention is illustrated in Figs. *7a*, *7b*, and 9. The modified carton **19*a* includes the sleeve like section 23 and a modified flat section 21*a*. The section 21*a*** illustrated in Fig. *7a*, comprises a rectangular sheet of corrugated paperboard or fiber-board which has been scored and cut to provide a bottom panel **25*a*, side panels 27*a*, and end panels 29*a*. In addition, the material at the corners, intermediate the sections 27*a* and 29*a*, has been cut and scored to provide four corner tabs 59** which are adapted to be folded around the ends of the block of cheese to provide added resistance to a vertically applied crushing load. The finished package is illustrated in Fig. *7b*. The block of cheese has been first enclosed in the section **21*a* and has then been protectively surrounded by the sleeve-like section 23. As illustrated, the tab 59 is folded across the end panel 29*a*** to provide added strengthening at the corners. By fabricating the container in this manner, there is no waste material and, in addition, the finished container is stronger and will resist substantial crushing forces.

In the foregoing, there has been described an improved cheese carton for packaging cheese during the curing period and an improved method of applying the carton to a block of cheese which has been wrapped in a thin flexible, waterproof wrapper. A carton in accordance with the invention is inexpensive to fabricate, is mechanically strong and durable, and may be collapsed to a minimum volume for storage or for transport.

Various features of this invention may be employed in practicing the method of making Swiss or Emmenthaler cheeses which is described in the patent to James Bryan Stine, No. 2,494,636. During the curing period for Swiss cheese, i. e. the eye development period, the telescoping carton is desirably confined in a wire basket of the type which has been described to provide reinforcing for the sides of the box while at the same time permitting the expansion of the cheese within the carton.

Various features of the invention which are believed to be new are set forth in the appended claim.

I claim:

The method of curing natural cheese which comprises the steps of wrapping a block of such type of cheese in a plastic wrapper, placing a generally cross-shaped section of board material having a central panel and flaps extending therefrom on one face of the wrapped block and covering said one face with the central panel, folding the extended flaps of said cross-shaped piece around the faces of said block contiguous to said one face, thereby leaving one face of said block uncovered, passing a sleeve of rigid material having hinged top flaps attached to one end thereof over the folded flaps of said cross-shaped piece, the sleeve being passed onto said cross-shaped piece in the direction of folding of said flaps on said cross-shaped piece, folding said top flaps of said sleeve over the uncovered face of said block to cover the entire exposed face of said block, and applying pressure on said block in a direction generally perpendicular to said central panel of said cross-shaped piece and said top flaps of said sleeve.

References Cited in the file of this patent

UNITED STATES PATENTS

| Number | Name | Date |
|---|---|---|
| 619,475 | Gair | Feb. 14, 1899 |
| 1,925,113 | Rutledge | Sept. 5, 1933 |
| 2,037,428 | Newsom | Apr. 14, 1936 |
| 2,106,663 | Schlegel | Jan. 25, 1938 |
| 2,304,373 | Palmer | Dec. 8, 1942 |
| 2,394,936 | Palmer | Feb. 12, 1946 |
| 2,416,725 | Williamson | Mar. 4, 1947 |
| 2,424,693 | Jones | July 29, 1947 |
| 2,437,952 | Guyer | Mar. 16, 1948 |